(12) United States Patent
Wang et al.

(10) Patent No.: US 9,432,427 B2
(45) Date of Patent: Aug. 30, 2016

(54) SYSTEM AND METHOD FOR EFFECTIVELY CONTROLLING CLIENT BEHAVIOR IN ADAPTIVE STREAMING

(71) Applicant: Futurewei Technologies, Inc., Plano, TX (US)

(72) Inventors: Xin Wang, Rancho Palos Verdes, CA (US); Yongliang Liu, Beijing (CN); Shaobo Zhang, Shenzhen (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 202 days.

(21) Appl. No.: 14/341,665

(22) Filed: Jul. 25, 2014

(65) Prior Publication Data

US 2015/0032855 A1    Jan. 29, 2015

Related U.S. Application Data

(60) Provisional application No. 61/858,536, filed on Jul. 25, 2013.

(51) Int. Cl.

| | |
|---|---|
| *G06F 15/16* | (2006.01) |
| *H04L 29/06* | (2006.01) |
| *H04N 21/2343* | (2011.01) |
| *H04N 21/24* | (2011.01) |
| *H04N 21/81* | (2011.01) |
| *H04N 21/845* | (2011.01) |
| *H04N 21/262* | (2011.01) |

(Continued)

(52) U.S. Cl.
CPC ........... *H04L 65/60* (2013.01); *H04L 65/4092* (2013.01); *H04L 65/602* (2013.01); *H04N 21/23439* (2013.01); *H04N 21/24* (2013.01); *H04N 21/26258* (2013.01); *H04N 21/44204* (2013.01); *H04N 21/6543* (2013.01); *H04N 21/6582* (2013.01); *H04N 21/812* (2013.01); *H04N 21/8456* (2013.01)

(58) Field of Classification Search
USPC ................................. 709/219, 218, 217, 231
See application file for complete search history.

(56) References Cited

U.S. PATENT DOCUMENTS

| | | | |
|---|---|---|---|
| 7,610,597 B1 * | 10/2009 | Johnson ................. G06Q 30/02 725/32 |
| 2010/0169459 A1 * | 7/2010 | Biderman .......... H04N 7/17318 709/219 |

(Continued)

OTHER PUBLICATIONS

Giladi, "Defining DASH Client Behavior," International Organization for Standardization Organization Internationale De Normalization ISO/IEC JTC1/SC29/WG11 Coding of Moving Picture and Audio, Jul. 2012, 4 pages.

(Continued)

*Primary Examiner* — Jude Jean Gilles
(74) *Attorney, Agent, or Firm* — Slater Matsil, LLP

(57) ABSTRACT

The present invention teaches new solutions based on an alternative approach to controlling client behavior in adaptive streaming applications, namely, server managed adaptive streaming. in this approach, the client makes requests for streaming content and provides extra information about its behaviors, and the server verifies the information to determine if the requests can be granted. This way, even if the client is not trusted, its behaviors can be properly and effectively controlled. Moreover, all of the solutions resulting from adopting this server managed adaptive streaming approach fit into the MPEG/3GPP standards of Dynamic Adaptive Streaming over HTTP (DASH).

26 Claims, 7 Drawing Sheets

(51) Int. Cl.
*H04N 21/442* (2011.01)
*H04N 21/6543* (2011.01)
*H04N 21/658* (2011.01)

(56) References Cited

U.S. PATENT DOCUMENTS

| | | |
|---|---|---|
| 2012/0311651 A1 | 12/2012 | Kahn et al. |
| 2013/0007298 A1 | 1/2013 | Ramaswamy et al. |
| 2013/0042100 A1 | 2/2013 | Bouazizi et al. |
| 2013/0291082 A1* | 10/2013 | Giladi .................. H04L 63/123 726/7 |
| 2014/0317308 A1* | 10/2014 | Zhang ................ H04L 65/4069 709/231 |

OTHER PUBLICATIONS

Wang, et al., "On Server-Managed Adaptive Streaming in DASH," International Organization for Standardization Organization Internationale De Normalization ISO/IEC JTC1/SC29/WG11 Coding of Moving Picture and Audio, Jan. 2013, 8 pages.

* cited by examiner

```
<BaseURL>http://cdn1.example.com/</BaseURL>        500

<URLParameter id="SegNumber" queryRequest="true"/>
<URLParameter id="AvailableBandwidth" queryRequest="true"/>
<URLParameter id="SumOfPlayedSegmentNumbers" queryRequest="true"/>

<SegmentTemplate duration="4" startNumber="1" media="video.php"/>
```

Figure 5

```
<BaseURL>http://cdn1.example.com/</BaseURL>                         600

<URLParameter id="SegNumber" queryRequest="true"/>
<URLParameter id="AvailableBandwidth" queryRequest="true"/>
<URLParameter id="LastPlayedSegmentNum" queryRequest="true"/>
<URLParameter id="QRCodeURLofLastPlayedSegment" queryRequest="true"/>

<SegmentTemplate duration="4" startNumber="1" media="video.php"/>
```

Figure 6

```
<BaseURL>http://cdn1.example.com/</BaseURL>

<URLParameter id="SegNumber" queryRequest="true"/>
<URLParameter id="AvailableBandwidth" queryRequest="true"/>
<URLParameter id="LastPlayedSegmentNumberInPeriodOne" queryRequest="true"/>

<SegmentTemplate duration="4" startNumber="1" media="video.php"/>
```

SYSTEM AND METHOD FOR EFFECTIVELY CONTROLLING CLIENT BEHAVIOR IN ADAPTIVE STREAMING

CLAIM OF PRIORITY

This application claims the benefit of U.S. Provisional Patent Application No. 61/858,536, filed Jul. 25, 2013, which is herein incorporated by reference in its entirety and for all matters.

BACKGROUND OF THE INVENTION

In adaptive streaming, it is desirable to control what content a streaming client needs to play out, for how long, and for how often. This is important especially for streaming advertisement-supported content. In content streaming, there are situations where content is streamed without allowing skipping or bypassing of content. One example is when a user watches advertisement-supported content with ad content that needs to be streamed in its entirety or a specified portion (e.g., an initial 5 seconds at least) prior to the streaming and display of the main or desired media content. In this advertisement supported scenario, for example, an ad may be inserted at the start (pre-roll), in the middle (mid-roll), and/or towards the end (post-roll) of the main media content, and watching or skipping the ad may help determine whether the user is allowed to watch the associated media content, and/or which (low or high quality) version of it.

Another example includes mandatory training materials streamed online or through an information delivery service where it is desirable to ensure that the user actually views the content and receives the information contained within the streaming content, either as evidence that suggests the information is actually delivered or that the streaming service is actually provided to the user. This kind of streaming content can be content accompanied with other content.

Many existing approaches for dealing with these issues are largely client-managed. That is, these approaches are dependent on passing the controlling information to the client and letting the client behave accordingly. For instance, in order to have a forced play-out of a piece of content, playing a segment can be made dependent on processing or play-out of its preceding segment. A way to accomplish this is to prepare a chain of encrypted content segments, each of which hides a decryption key for its next segment, and thus for the client to play a segment, the client is required to process its preceding segment and is consequently "forced" to play out all the segments in a sequential order. Unfortunately, these solutions are often ineffective, largely because the client may not be trustworthy itself, or it may operate within a hostile environment.

In addition, there are a number of other efficacy issues with these client-managed approaches to controlling client behaviors. In addition to the assumption that the client is trustworthy and compliant with viewing protocols, which may not be the case in practice when the client (and by extension a user) has access to all the segments to manipulate, the client also needs to become more complex when being able to discover and process the controlling information, and it is rather difficult to define all kinds of controlling information in a standard manner.

Dynamic Adaptive Streaming over HTTP (DASH) is a popular adaptive bitrate streaming technique for high quality streaming of multimedia content over the Internet delivered from conventional HTTP web servers. DASH streaming typically partitions media content into a sequence of small file segments, each segment containing a portion of the media content in a short interval of playback time. Typically, the content is made available with a media presentation description (MPD) file, which describes segment information (such as timing, URL, media characteristics such as video resolution and bit rates). One or more representations (i.e., versions of the same segments at different resolutions, bit rates, or other factors) of the media content are typically available, and a selection can be made (typically automatically) based on network conditions, device capabilities and user preferences, enabling adaptive streaming and Quality of Experience (QOE) restrictions. For example, generally when content is played by a DASH client, the client automatically selects from the available segments the next segment to download with the highest bit rate possible that can be downloaded in time for play back without causing pauses or rebuffering events in the playback.

However, DASH streaming presents additional problems to client-managed adaptive streaming. For example, since DASH implementations may not mandate client behavior, there may be no guarantee in presenting a coherent user experience of a same piece of streaming content across devices with different DASH client implementations. This may be undesirable, especially from content owner's perspectives. Additionally, it may be difficult to regulate adaptation logic of the client in a dynamic manner, for instance, according to how a service provider wants the content being streamed to different classes of subscribers. Moreover, as dynamic adaptation is also managed by the client, the content information at all levels including potential periods, adaptation sets, representations and segments has to be prescribed in an MPD and communicated to the client prior to the time the client starts streaming. This issue becomes significant and even un-resolvable when it comes to streaming dynamic events: e.g., emergency alerts; dynamic content: e.g., live advertisement insertion; irregularly updated content: e.g., a basketball game with irregular time-outs; and/or large, or even unlimited, number of potential representations among which adaptation can happen dynamically.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to a novel, alternative approach to controlling client behavior in adaptive streaming applications, namely, server managed adaptive streaming. According to an aspect of the claimed subject matter, the client (typically a web browser or video streaming application executing on a computing device) makes requests for streaming content and provides extra information about its behaviors, and the server verifies the information to determine if the requests can be granted. This way, even if the client is not trusted, its behaviors can be properly and effectively controlled. Moreover, all of the solutions resulting from adopting this server managed adaptive streaming approach fit into the MPEG/3GPP standards of Dynamic Adaptive Streaming over HTTP (DASH).

According to one or more embodiments of the server managed adaptive streaming approach, the client collects values of a given set of adaptation parameters within its environment, and makes a content segment request by providing these parameter values to the server. The server then makes an adaptation decision and returns a content segment that fits into the adaptation parameter values provided by the client. To use this approach to control client behaviors, the client makes segment requests together with supplementary evidence information required by the server, and lets the server control segment delivery based on information about the behavior of the client on previous segments and/or upcoming segments, and to make delivery of subsequent segments when the information is authorized.

Additional advantages and features of the invention will become apparent from the description which follows, and may be realized by means of the instrumentalities and combinations particular point out in the appended claims.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 depicts a first exemplary portion of a Media Presentation Description, in accordance with embodiments of the present invention.

FIG. 6 depicts a second exemplary portion of a Media Presentation Description, in accordance with embodiments of the present invention.

FIG. 7 depicts a third exemplary portion of a Media Presentation Description, in accordance with embodiments of the present invention.

DETAILED DESCRIPTION

Figure 1:
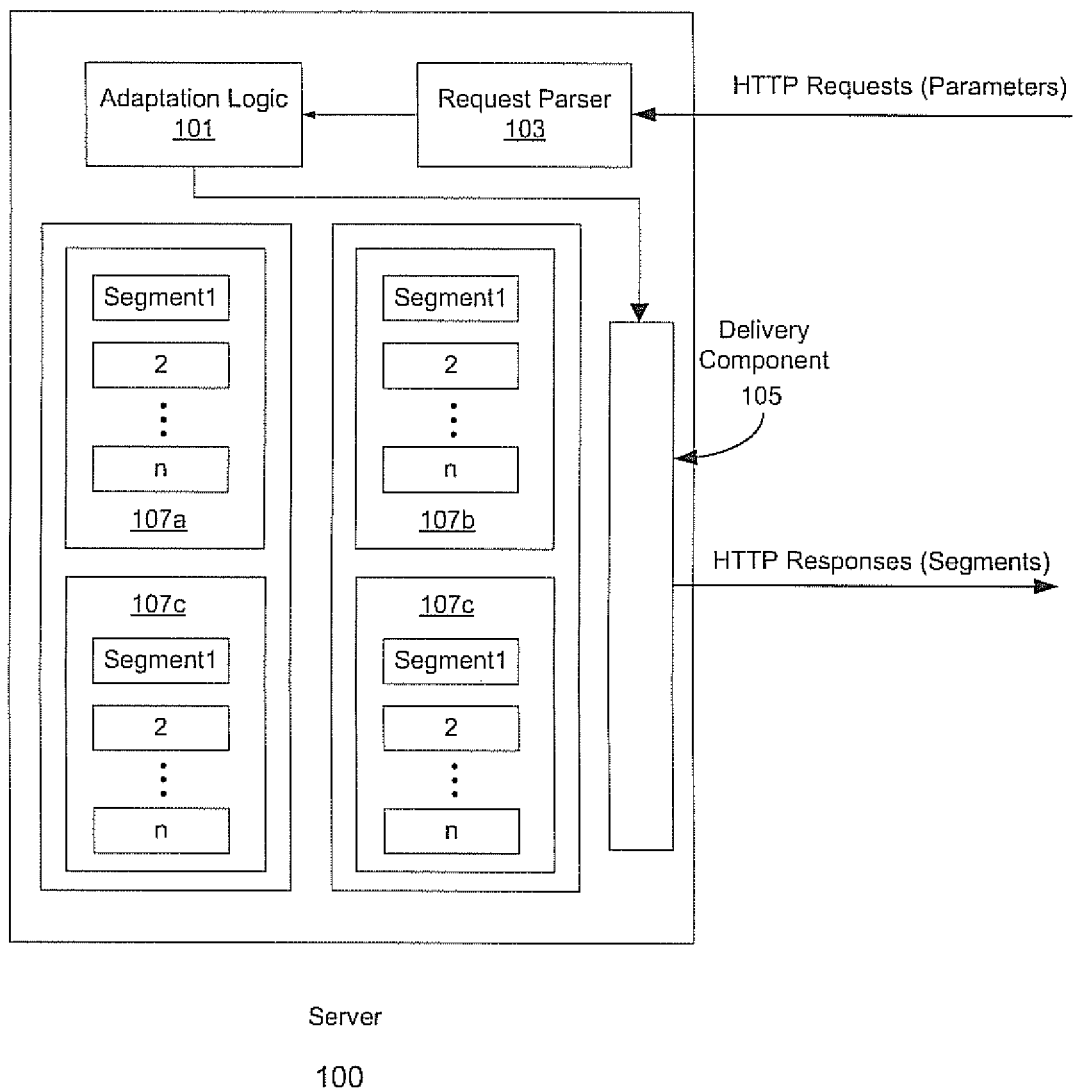
FIG. 1 depicts a block diagram of an exemplary server architecture in a server-managed adaptive streaming system, in accordance with embodiments of the present invention.

Reference will now be made in detail to the preferred embodiments of the claimed subject matter, a method and system for the use of a radiographic system, examples of which are illustrated in the accompanying drawings. While the claimed subject matter will be described in conjunction with the preferred embodiments, it will be understood that they are not intended to limit these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to obscure unnecessarily aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the claimed subject matter provide a method and system for server-managed adaptive streaming.

Server Managed Adaptive Streaming (SMAS)

Because of the issues with client managed adaptive streaming noted above—in particular with the existing DASH client-managed adaptive streaming technique—an alternative, server-managed adaptive streaming (SMAS) approach for DASH, leveraging the three-tier or multi-tier web architecture commonly seen in web applications equipped with server-side information processing capabilities. FIG. 1 depicts an illustrative architecture of a server 100 in a server-managed adaptive streaming system 100. One exemplary implementation of this server-managed adaptation streaming (SMAS) approach for passing adaptation and other parameters from the client to the server is to use the solutions for the parameter insertion within media segment uniform resource locators (URLs), to specify what parameters that the server requires and optionally requires from the client when it makes requests for media segments.

From a system architecture point of view, the Adaptation Logic module 101 is moved from the client to the server 100. According to such an embodiment, the client is able to make requests for segments by submitting adaptation parameters to the server, and the server 100 is configured to perform segment selections and adaptation decisions, as shown in FIG. 1. In one or more embodiments, the Adaptation Logic module 101 resides on the same server 100 that also hosts the streaming segments. In one or more alternate embodiments, the Adaptation Logic module 101, or some of its functions are delegated to other servers, depending on specific applications, designs and deployments.

As depicted in FIG. 1, a server 100 may execute (via a processor for example) an Adaptation Logic Component 101, a Request Parser 103, and a Delivery Component 105. One or more sequences (107a, 107b, 107c, 107d) of media content may also be hosted (e.g., in a memory or storage) in the server 100. According to one or more embodiments, the sequences (107a, 107b, 107c, and 107d) are apportioned as a plurality of discrete segments (e.g., Segment 1, 2 . . . n). Each of the media content sequences may contain a number of segments, based on, for example, the length, content, quality, etc., of the particular media content.

According to one or more embodiments, the server 100 may receive a plurality of media content requests from a plurality of remotely located client computing devices. According to such embodiments, these requests may also include parameters specified by the server in previously transmitted MPDs. The requests are received in the Request Parser 103, which parses the data to identify and collect the appropriate parameter and client behavior data. Once properly identified by the Request Parser 103, the collected data is forwarded to the Adaptation Logic Component 101, which determines the appropriate response to deliver to the requesting client.

If the client's supplied parameter and client behavior data matches the information requested in the MPD and meets some criteria for well-behaved clients, that is, if the client's behavior is indicative of the behavior desirable to the server (e.g., playback of advertised content), the server may determine the particular segment (which may be from a plurality of different versions) to deliver back to the client. Delivery of the segment may be performed by Delivery Component 105, and sent as discretized segments using the HTTP transport protocols.

Figure 2:
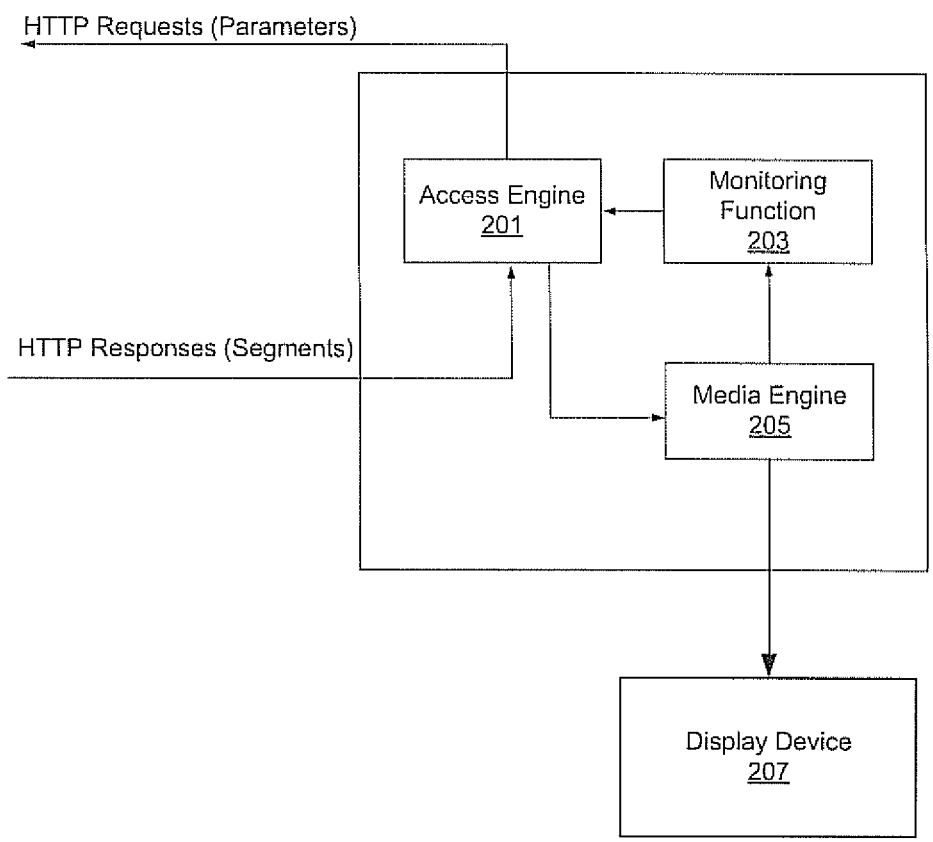
FIG. 2 depicts a block diagram of an exemplary client architecture in a server-managed adaptive streaming system, in accordance with embodiments of the present invention.

FIG. 2 depicts an exemplary architecture of a client computing device 200. As depicted in FIG. 2, a client computing device 200 may execute (also via a processor) an Access Engine 201, a Monitoring Function Component 203, and a Media Engine 205. According to further embodiments, the client computing device 200 may also include a display device 207, or otherwise be communicatively coupled to a display device 207.

According to one embodiment, client computing device 200 sends a request for media content to a remote server (e.g., server 100). The request may, for example, specify a particular segment of a sequence of media content, as identified in a media presentation description (MPD) previously obtained from the server (e.g., server 100 of FIG. 1). In one or more embodiments, the request may be implemented as a request using the HTTP transport protocol. According to an embodiment, the MPD includes a plurality of data parameters, (collectively referred to as adaptation information or parameters), the client may be required to provide before the particular segment is delivered from the server. Once the client gathers necessary adaptation information, the adaptation information is passed from the client computing device 200 to the server 100, and the server 100 determines the response it will produce and provide to the client based on the adaptation information received. In further embodiments, instructions on the particular adaptation information that is required by the server or optional for the client to collect can be specified within the MPD.

According to one or more embodiments, some or all of the set of adaptation parameters corresponds to behavior exhibited by the client computing device 200 as monitored by a Monitoring Function Component 203. According to such embodiments, for media content received from the server by the client computing device 200 (e.g., in the Access Engine 201) the media content is sent from the access Engine 201 to a Media Engine 205, which prepares the media content for display (e.g., in display device 207). The Media Engine 205 may prepare the media content for display by, for example, buffering/decoding/decompressing the media content, aggregate received segments into a contiguous sequence, and/or perform the rendering of the actual display of content. Media Engine 205 may track the MPD data of the rendered segments, which monitoring function 203 receives and forwards to the Access Engine 201 to send to the server for subsequent content requests. In alternate embodiments, the monitoring function 203 may perform monitoring and tracking of the MPD data of rendered segments.

In one or more embodiments, the adaptation parameters specified in the MPD and collected by the client can be sent to the server to provide a segment that is most suitable to the client environment. These parameters may include (but are not limited to) dynamic parameters, and static parameters. Dynamic parameters may include, for example: the measured time value of buffered media data (e.g., in seconds); a current available bandwidth (e.g., in bytes per second); a starting time of media data that is requested (e.g., in seconds); the number of the segment requested; the location and/or size of the region of interest (e.g., coordinate values, or axis values in pixels). Static parameters may include, for example: a display resolution (e.g., in pixels); the codec; a maximum buffer size (e.g., in bytes); a component (e.g., video; audio; video and audio); and a language requested.

Figure 3:
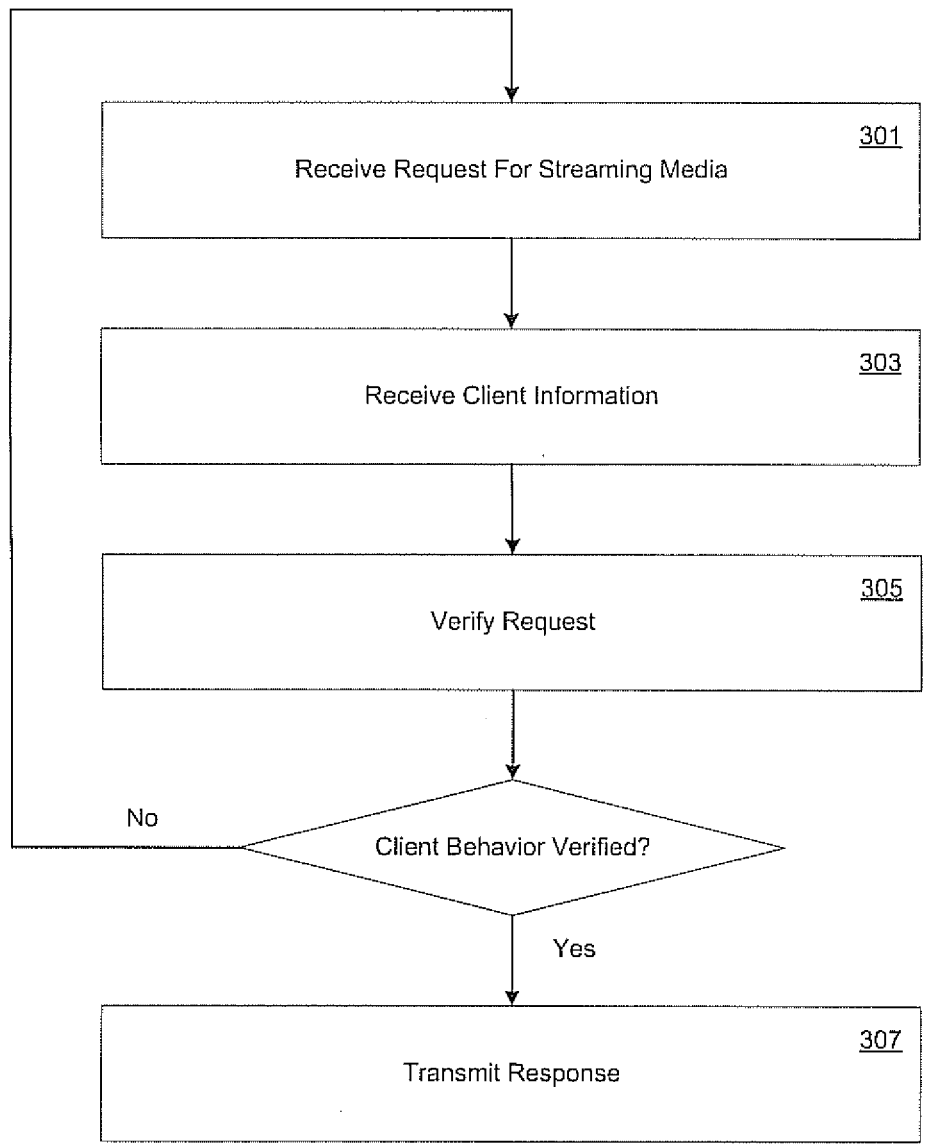
FIG. 3 depicts a flowchart for an exemplary process performed by a server for performing media content streaming in a server-managed adaptive streaming system, in accordance with embodiments of the present invention.

FIG. 3 depicts an exemplary process 300 of a transmission protocol that may be performed by a server (e.g., server 100 of FIG. 1) within a server managed adaptive streaming system. Steps 301 to 307 describe exemplary steps comprising the process 300 depicted in FIG. 3 in accordance with the various embodiments herein described. In one embodiment, the process 300 is implemented in whole or in part as computer-executable instructions stored in a computer-readable medium and executed by one or more processors and/or processing units of a server computing device.

At step 301, a request for streaming media is received in a server from a client computing device. In one or more embodiments, the client computing device is remotely located from the server, and communicatively coupled through a network. In one or more embodiments, the request is generated in and sent from an Access Engine (e.g., Access Engine 201 in FIG. 2) executing in the client computing device. In one or more embodiments, the request may be received in a Request Parser (e.g., Request Parser 103 in FIG. 1) executing in the server. In one or more embodiments, the request may be formatted according to a media presentation description (MPD) previously obtained by the client computing device from the server, detailing the specific parameters requested to view the requested media content, and a description and/or identification of the particular segment itself. The specific parameters may, for example, correspond to client behavior in previously transmitted segments of the same media content.

The client (e.g., Access Engine 201) gathers the necessary data requested by the MPD and transmits the client information back to the server, where it is received (e.g., in the Request Parser). At step 303, the client behavior is parsed and formatted by the Request Parser 103 before being forwarded to the Adaptation Logic Component 101. The Adaptation Logic Component 101 authenticates the request and the received parameters at step 305, and if the parameters (including those that are representative of client behavior) are verified, especially against some criteria for well-behaved clients, the request is granted and the Adaptation Logic Component 101 determines the desired segment to be delivered to the client. At step 307, a response is delivered (e.g., via Delivery Component 105 of FIG. 1). The response can comprise the segment identified once the client information is verified and request is granted. If, however, the request and/or the parameters are not verified, the request is denied and the desired segment is not provided to the client in the response. Instead, the client may be encouraged to perform requested behavior (e.g., rendering of previously supplied advertisement or other alternative media content), or may be provided with the advertisement or other alternative media content again in the response. A subsequent request from the client may be received and processed, ad hoc. In one or more embodiments, each sequence of media content (e.g., an episode, or film) is apportioned as a series of discrete segments. The process 300 for receiving requests and transmitting segments detailed above may be performed for each segment until the entire sequence is complete, or until the user (via the client) terminates playback.

Figure 4:
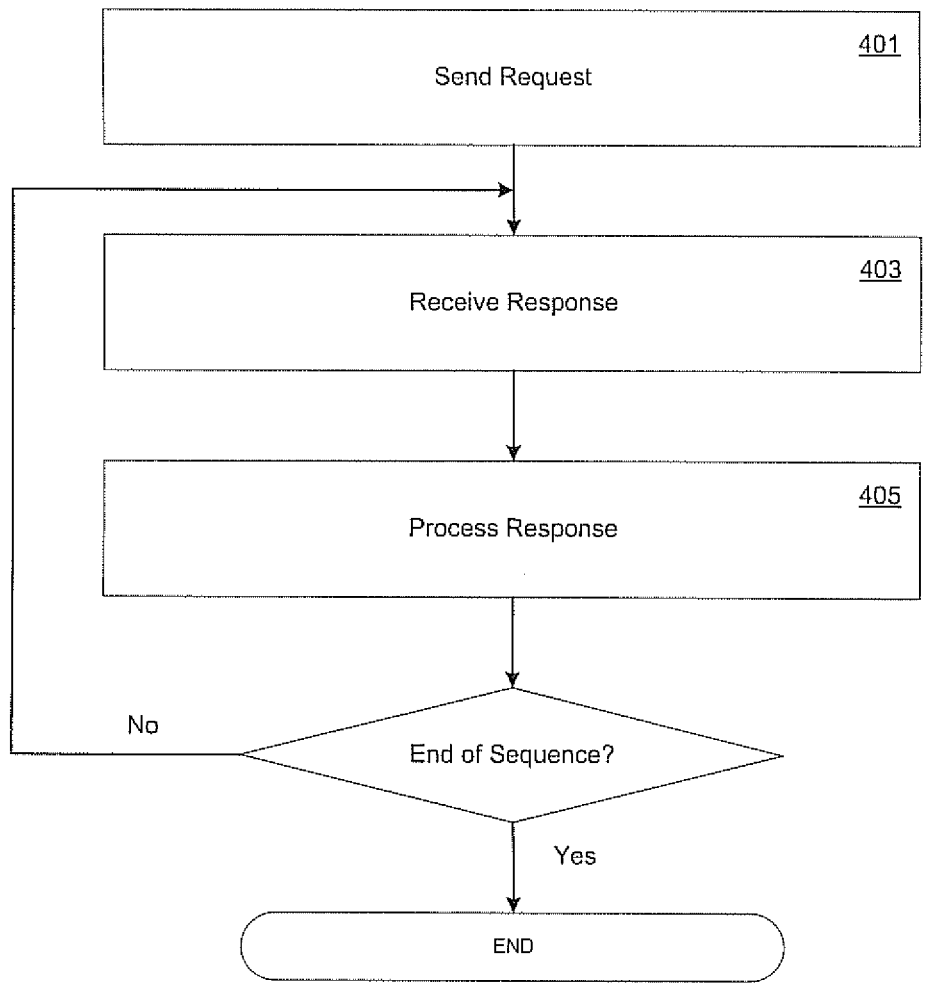
FIG. 4 depicts a flowchart for an exemplary process performed by a client computing device for performing media content streaming in a server-managed adaptive streaming system, in accordance with embodiments of the present invention.

FIG. 4 depicts an exemplary process 400 of a transmission protocol that may be performed by a client (e.g., client computing device 200 in FIG. 2) under a server managed adaptive streaming system. Steps 401 to 405 describe exemplary steps comprising the process 400 depicted in FIG. 4 in accordance with the various embodiments herein described. In one embodiment, the process 400 is implemented in whole or in part as computer-executable instructions stored in a computer-readable medium and executed by one or more processors and/or processing units of a client computing device.

At step 401, a request for a desired segment of the one or more segments of media content is sent from the client computing device to the server. The request may be sent by the access engine executing on the client computing device, for example. In one or more embodiments, the client (e.g., Access Engine 201) gathers the necessary data requested by a Media Presentation Description (MPD), and the request sent in step 401 may include the client information that corresponds to the one or more parameters required by the MPD to access the desired segment. The data gathering step may be performed contemporaneously or near-contemporaneously as a separate step. In one or more embodiments, the MPD may be implemented as a file, for example, or a plurality of data packets. The MPD may include information specifying and/or identifying one or more segments of a sequence (e.g., episode, feature) of media content, and one or more of parameters required to access the one or more segments.

At step 405 the client (e.g., Access Engine 201) receives a response from the server to the request sent in Step 403. If the transmitted client information is approved and authenticated by the server, the server will send a response that includes the specified (desired) media content, which the client receives at step 403. In one or more embodiments, the desired media content also includes additional advertised content that the client must display before displaying the desired media content, or before the next segment of the sequence of media content is requested and is delivered. If however, the data supplied by the client is not authenticated by the server, the request may be denied, the response may include the advertised content for the client to render, and/or the client may be encouraged to perform the requested behavior and reattempt a request. In further embodiments, the display and/or rendering of each segment of media content is monitored, and the data is supplied for one or more subsequent requests (for segments) in the sequence. In one or more embodiments, each sequence of media content (e.g., an episode, or film) is apportioned as a series of discrete segments. The process 400 for requesting and displaying segments detailed above may be performed for each segment until the entire sequence is complete, or until the user (via the client) terminates playback.

Controlling Client Behaviors using the Server Managed Adaptive Streaming Approach According to one or more embodiments of the claimed subject matter, a content provider is able to offer alternative multimedia content over the Internet, that is, media content that is sponsored by advertisers, or training/educational materials that is intended to be viewed in a particular order or sequence. According to these embodiments, short alternative features (also multimedia content) may be played during playback of the multimedia content. According to such embodiments, the content provider is able to bill the advertiser (or training server) by tracking and reporting the number of times an advertisement (or training media) is streamed to a viewer, for example. To be counted as an impression and to be able to bill the advertisement/training provider, the content provider typically needs to ensure that the advertisement/training material has indeed been played out at the client.

According to one or more embodiments, Flexible Ad Insertion is performed to ensure play out of an alternative media feature at a client. In one or more embodiment, alternative media features may be inserted flexibly, with the particular content of the ad being determined at the last moment prior to delivery. According to further embodiments, the position of the advertisement, the duration it needs to be displayed, and the number of viewings before the advertisement is allowed to be skipped, can each be flexible and controllable. For example, the user is allowed to skip an advertisement feature after watching it for at least a predetermined period of time (e.g. 7 seconds). In another example, the advertisement needs only to be watched once and the user can scroll back and forth without having to see an advertisement for an extended period of time (e.g. 30 minutes).

According to one or more embodiments, forced play out and flexible alternative media insertion is implemented using a server managed adaptive streaming approach by specifying a number of evidence parameters with an media presentation description (MPD) that indicates the client has played the alternative media. These evidence parameters can range widely depending on the security robustness and computation complexities of the viewing client. For instance, one evidence parameter can be simply a product of segment numbers of the alternative media segments the client has played, and another one can be an accumulation of signature values of the alternative media segments. In the latter case, the signature values can be cryptographic hash values, digital signatures, or compact descriptors used for visual search (CDVS) for video content. In one or more embodiments, the evidence parameters can provide information or an indication that can be used to verify that the user indeed is watching or has watched the alternative media.

FIG. 5 depicts an exemplary portion of an MPD 500. As depicted in FIG. 5, the server sends an MPD (or the MPD is otherwise obtained by the client) requesting the client to return a sum of segment numbers ("SumOfPlayedSegment-Numbers") of the alternative media segments within a period the client has played, in addition to the parameters of the segment number of the segment requested ("SegNumber") and the bandwidth available to the client ("AvailableBandwidth"). With the MPD depicted in FIG. 5, the client then constructs a URL to request for the segment number desired (e.g., 4), with the bandwidth available (e.g., 800 kb/s), and the sum of segment numbers played (e.g., 6). In this exemplary scenario, with the returned parameter values, the server is able to determine that the request is valid as the client has played segments 1, 2 and 3 and is requesting segment 4, and will return a segment 4 that fits the available 800 kbps bandwidth.

FIG. 6 depicts another exemplary portion of a MPD 600, showing the need for the client to return an URL carried in a Quick Response (QR) code embedded in a last played segment, again in addition to the parameters of the segment number of a segment to be requested and client's available bandwidth. Once the MPD depicted in FIG. 6 is received by the client, the client can construct a URL to request for a segment number (e.g., 4), to fit available network bandwidth (e.g., 800 kbps), and provide the number of the last played segment (e.g., 1) and the URL carried in the QR code of that segment. Upon receiving the request, the server is able to determine that the request is valid by checking if the identified segment has the correct QR code URL. If it is valid, the server will return the requested segment that fits the available bandwidth.

Flexible Ad Insertion

According to one or more embodiments, alternative media may be flexibly inserted during playback. In an embodiment, Flexible Ad Insertion may be performed under the CMAS approach. Under the CMAS approach, a content play-out policy may be communicated to the client, with the expectation that, once accepted by the user, the client follows the policy accordingly. For instance, this policy can be part of a usage rights license, or a contract written in the MPEG-21 Contract Expression Language (CEL), governing the relevant period of the streaming content.

Alternatively, in one or more embodiments, Flexible Ad Insertion may be performed with a SMAS approach to implement a content play-out policy on the server side, with or even without explicitly communicating the policy to the client. The SMAS approach is flexible in delivering dynamic content and notifying dynamic events, even when, for instance, the content of the ad is determined at the last moment prior to delivery. According to an embodiment, this is achieved by the server by returning a new or updated MPD containing the dynamic content in response to a client's media segment request. In alternate embodiments, the server can instead (or in addition to) provide an event notification in response to the client's media segment request. This returned MPD can contain new or updated data to signal a newly determined position, duration and segment URLs of an advertisement. Upon receiving a new or updated MPD, the client can either replace the pre-existing MPD with the new MPD or combine them into a single composite MPD based on the timing information within the two. After this, the client can decide whether to repeat the previous segment request or start a new segment request.

According to one or more embodiments, with this particular implementation, the client is required to supply segment play-out information when requesting for new segments in order for the server to verify the play-out behavior of the client and to grant delivery of the requested segment. The information can, for instance, include: the segment number of last segment played within a given period, the number of times it has been played, signature verification information of the last played segment, or even some information that is obtained out-of-band from some other service verifying the actual content segment play-out by the client.

For instance, for ad-supported video streaming situations where there are two periods in an MPD, with the first one being an advertisement feature with a regulated play, a control policy such as "the user is allowed to skip the advertisement after watching the feature for a duration exceeding a predetermined threshold (e.g. 7 seconds)" can be implemented. FIG. 7 depicts such an exemplary portion of a MPD 700 that may be used under such an implementation. As depicted in FIG. 7, if the client sends a URL to request for segment number 1 in the second period (e.g., trying to skip the ad in the $1^{st}$ period, after watching the first two ad segments), the server can return the requested segment (if the required viewing duration is exceeded). However, if the client submits a URL that attempts to skip the advertisement, after only watching an insufficient duration, the server will decline the request. According to further embodiments, an alternate control policy expressed as "the advertisement needs to be watched once, after which the user can scroll back and forth without having to see another advertisement for a limited duration (e.g., 30 minutes)", can be implemented in a similar manner controlled by the server.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for streaming multimedia content, the method comprising:
   receiving, in a server, a request for a segment of a streaming media content from a client computing device, the segment of the streaming media content being comprised in a sequence of streaming media content;
   receiving client information corresponding to a plurality of parameters from the client computing device, the plurality of parameters based on a media presentation description (MPD) obtained by the client computing device and corresponding to the segment of streaming media;
   verifying the request based on the client information; and
   transmitting a response based on a verification of the request.

2. The method according to claim 1, wherein the client information comprises client behavior information corresponding to a client behavior exhibited by the client computing device, further wherein verifying the request based on the client information comprises verifying that the client behavior exhibited by the client computing device meets criteria enforced by the server.

3. The method according to claim 2, wherein transmitting a response comprises transmitting a segment of media content that is the segment of media content specified in the received request, if a result of verifying the request is acceptable to the server.

4. The method according to claim 3, wherein transmitting a response comprises transmitting a segment of media content that is different from the segment of media content specified in the received request if the result of verifying the request is not acceptable to the server.

5. The method according to claim 4, wherein the plurality of parameters corresponding to a client computing device includes at least one parameter indicative that a number of particular content segments were displayed in the client computing device, and the criteria include that a number of particular content segment are required to be displayed.

6. The method according to claim 5, wherein the at least one parameter indicative that a number of particular content segments were displayed in the client computing device comprises at least one parameter from the group of parameters consisting of:
   a plurality of segment numbers corresponding to the particular content segments that have been displayed in the client computing device;
   a plurality of signature values corresponding to the particular content segments;
   a plurality of cryptographic hash values corresponding to the particular content segments;
   a plurality of digital signatures corresponding to the particular content segments; and
   a plurality of compact descriptors used for visual search (CDVS) for video content corresponding to the particular content segments.

7. The method according to claim 1, wherein transmitting a response comprises inserting flexible alternative media content.

8. The method according to claim 7, wherein the alternative media content comprises at least one of:
   advertised media content; and
   training media content.

9. The method according to claim 7, wherein inserting flexible alternative media content comprises at least one action from the group of actions consisting of:
   sending a new MPD comprising dynamic alternative media content in response to the request for streaming media from the client computing device;
   sending an updated MPD comprising dynamic alternative media content in response to the request for streaming media from the client computing device; and
   sending an event notification in response to the request for streaming media from the client computing device, the event notification comprising information corresponding to dynamic alternative media content.

10. The method according to claim 1, wherein the plurality of parameters comprises at least one dynamic parameter from a group of dynamic parameters consisting of:
   buffered media data corresponding to the client computing device;
   a current bandwidth corresponding to the client computing device;
   a time corresponding to the request for streaming media content;
   a segment number of a segment of media content requested;
   a region of interest location corresponding to the request; and
   a display size corresponding to the client computing device.

11. The method according to claim 1, wherein the plurality of parameters comprises at least one static parameter from a group of static parameters consisting of:
   a display resolution corresponding to the client computing device;
   a coded capability corresponding to the client computing device;
   a maximum buffer size corresponding to the client computing device;
   a component selected corresponding to the client computing device; and
   a language corresponding to the client computing device.

12. The method according to claim 1, wherein the method is substantially compliant with Dynamic Adaptive Streaming over HTTP (DASH) standards.

13. The method according to claim 1, wherein the method is repeatable for each segment of a plurality of segments comprising the sequence of media content.

14. A method for requesting streaming content from a server, the method comprising:
   sending a first request for a first segment of a sequence of media content to a server, the first request comprising identification information of the first segment and client information based on a plurality of parameters specified in an MPD corresponding to the sequence of media content;
   receiving a response from the server based on the first segment and client information, the response comprising the first segment when the client information is validated by the server, and a behavioral request when the client information is not validated by the server; and
   processing the response from the server, wherein processing the response comprises rendering the first segment when the first request is verified by the server, and
   wherein the client information corresponds to behavior exhibited by the client computing device.

15. The method according to claim 14, further comprising:
   monitoring a behavior of the client computing device;
   collecting data corresponding to the plurality of parameters based on a rendering of the first segment; and
   sending a second request for a second segment of the sequence of media content to the server, the second request comprising client information corresponding to the rendering of the first segment.

16. The method according to claim 14, wherein receiving the response from the server comprises receiving alternative media content, and wherein rendering the first segment of media content comprises rendering the alternative media content.

17. The method according to claim 16, wherein the alternative media content comprising at least one of:
   advertised media content; or
   training media content.

18. The method according to claim 16, wherein rendering the alternative media content comprises at least one of:
   a forced play out of the alternative media content; or
   a flexible insertion of the alternative media content.

19. The method according to claim 14, wherein the plurality of parameters comprise a plurality of static parameters and a plurality of dynamic parameters.

20. A system for server managed adaptive streaming, the system comprising:
   a server computing device comprising:
      a processor;
      a storage device comprising a plurality of segments of media content; and
      a memory comprising a plurality of programmed instructions, which when executed by the processor is operable to execute:

a request parser component configured to receive a plurality of media requests from a plurality of client devices;

an adaptation logic component configured to send a media presentation description (MPD) comprising a description of the plurality of segments of media content and specifying a plurality of parameters for the client computing device; and a delivery component configured to transmit responses to the client computing device, the responses comprising identified segments from the plurality of segments of media content, wherein, the delivery component transmits responses to the client computing device when client behavior information corresponding to the plurality of parameters is verified by the adaptation logic component.

21. The system according to claim 20, wherein the responses transmitted by the delivery component further comprises alternative media content.

22. The system according to claim 21, wherein the adaptation logic component is further configured to perform a forced play out of the alternative media content at the client computing device by verifying that the client behavior exhibited by the client computing device comprises a rendering of the alternative media content in the client computing device prior to transmitting responses comprising segments from the plurality of segments of media content.

23. The system according to claim 21, wherein the adaptation logic component is further configured to perform flexible alternative media content insertion.

24. The system according to claim 23, wherein the adaptation logic component is further configured to send a new MPD comprising dynamic alternative media content in response to the request for streaming media from the client computing device.

25. A system for server managed adaptive streaming, the system comprising:

a client computing device comprising:

a processor; and a memory comprising a plurality of programmed instructions, which when executed by the processor is operable to execute:

an access engine configured to send requests for a plurality of segments of streaming media content to a remote server device, to receive a plurality of responses from the remote server device, the plurality of responses comprising a description of the plurality of segments of media content and specifying a plurality of parameters for the client computing device;

a media engine configured to receive the plurality of segments of media content and to render the plurality of segments of media content for display; and a monitoring function component configured to monitor the rendering of segments of media content in a display device, and to report the rendering of segments of media content in the display device to the access engine, wherein, the access engine is further configured to relay client information data based on the plurality of parameters to the remote server device, the client information corresponding to the display of segments of media content in the display device, and further wherein, the plurality of segments of media content comprises alternative media content.

26. The system according to claim 25, wherein the alternative media content comprises at least one of:

alternative media content displayed under a forced play out in the display device; or flexibly inserted alternative media content.

* * * * *